(12) United States Patent
Lee

(10) Patent No.: US 8,534,215 B2
(45) Date of Patent: Sep. 17, 2013

(54) EVACUATION CABIN

(76) Inventor: Stanley Shao-Ying Lee, Taipei (TW)

( * ) Notice: Subject to any disclaimer, the term of this patent is extended or adjusted under 35 U.S.C. 154(b) by 110 days.

(21) Appl. No.: 13/112,507

(22) Filed: May 20, 2011

(65) Prior Publication Data

US 2012/0291691 A1 Nov. 22, 2012

(51) Int. Cl.
*B63B 21/64* (2006.01)
*B63C 9/06* (2006.01)

(52) U.S. Cl.
USPC ........................................ 114/344; 114/349

(58) Field of Classification Search
USPC .......................................... 114/312, 349, 344
See application file for complete search history.

(56) References Cited

U.S. PATENT DOCUMENTS

| | | | | |
|---|---|---|---|---|
| 1,206,873 A | * | 12/1916 | Loewen | 114/165 |
| 1,227,284 A | * | 5/1917 | McWatters | 114/349 |
| 3,064,282 A | * | 11/1962 | Kangas | 114/349 |
| 4,297,757 A | * | 11/1981 | Palemon Camu | 114/349 |
| 6,058,848 A | * | 5/2000 | Futami et al. | 104/71 |
| 7,445,275 B2 | * | 11/2008 | Woodhouse et al. | 296/211 |
| 2002/0134295 A1 | * | 9/2002 | Chimato | 114/344 |

* cited by examiner

*Primary Examiner* — Stephen Avila
(74) *Attorney, Agent, or Firm* — Birch, Stewart, Kolasch & Birch, LLP

(57) ABSTRACT

An evacuation cabin includes an upper housing and a lower housing. The upper housing has a joining portion along a bottom edge of the upper housing and an opening at middle of one side of the upper housing for receiving an upper part of a water-sealable door. The lower housing has a joining portion corresponding and sealed to the joining portion of the upper housing such that the upper housing and the lower housing are sealed integrally and water-sealably, and an opening corresponding to the opening of the upper housing and for receiving a lower part of the water-sealable door. There are accommodated in the lower housing a power source acting as a weight to lower the center of gravity of the evacuation cabin so as to maintain the evacuation cabin in a stable condition when water floods the ground. A chassis, provided underneath the evacuation cabin, is mounted with an axle for installing wheels so that the evacuation cabin can stand stationary or be transported as a trailer by a mobile.

4 Claims, 4 Drawing Sheets

EVACUATION CABIN

BACKGROUND OF THE INVENTION

1. Field of the Invention

The present invention relates to an evacuation cabin, and more particularly, to a floatable and water-sealable evacuation cabin as a trailer or a utility trailer adapted for a mobile, such as a recreational vehicle (RV).

2. Description of Related Art

The horrible sight appeared on screens about the destructive tsunami triggered by the magnitude-9.0 (Richter Scale) earthquake in the north-east of Japan on Mar. 11, 2011 has left people worldwide unforgettable. Equally disastrous, not far away, was the sheer destruction caused by the tsunami following the Indian Ocean 9.2 magnitude earthquake on Dec. 26, 2004. Indeed, people living in coastal areas should be on alert to tsunami threat and think of approaches for keeping life saved.

A recreational vehicle often comprises a mobile, such as a tractor, and a wheeled self-supporting living unit, where the living unit as a trailer or a utility trailer may be furnished for temporary living condition. However, the living unit is neither floatable nor water-sealable, and cannot serve as an evacuation cabin, such as in the occasion of tsunami. A boat, though floatable, is not water-sealable, and still runs a risk of overturn.

SUMMARY OF THE INVENTION

Accordingly, the present invention provides an evacuation cabin having a self-supporting living unit and being water-sealable. In one embodiment of the invention, the evacuation cabin may be a trailer adapted for a mobile, such as a recreational vehicle, to meet the requirements for life saving.

An object of the present invention is to provide an evacuation cabin including an upper housing and a lower housing sealed integrally and water-sealably.

In one embodiment of the present invention, a chassis, provided underneath the evacuation cabin, is mounted with an axle for installing wheels so that the evacuation cabin can stand stationary or be transported as a trailer by a mobile.

According to the present invention, the evacuation cabin includes an upper housing and a lower housing. The upper housing has a joining portion along a bottom edge of the upper housing and an opening at middle of one side of the upper housing for receiving an upper part of a water-sealable door. The lower housing has a joining portion corresponding and sealed to the joining portion of the upper housing such that the upper housing and the lower housing are sealed integrally and water-sealably, and an opening corresponding to the opening of the upper housing and for receiving a lower part of the water-sealable door.

Further, according to the present invention, the upper housing is provided, at its top center, with solar panels; and provided, beside the solar panels, with ventilators.

Still further, according to the present invention, the lower housing is equipped with a set of furniture.

According to the present invention, there are accommodated in the lower housing a power source acting as a weight to lower the center of gravity of the evacuation cabin so as to maintain the evacuation cabin in a stable condition when water floods the ground.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
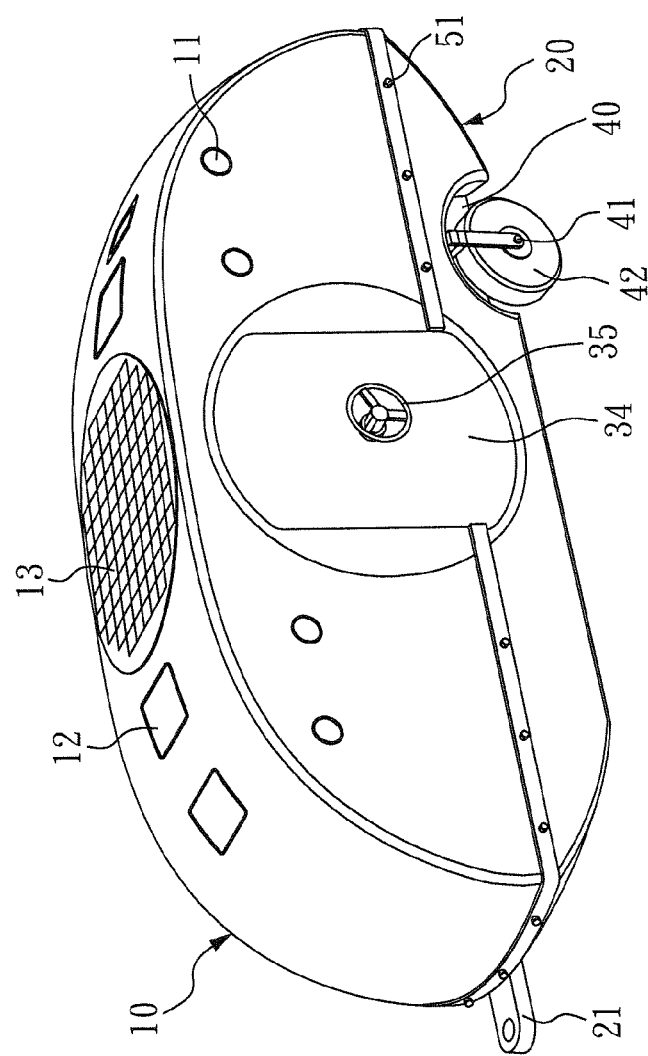
FIG. 1 is a perspective view illustrating an evacuation cabin according to the present invention.
Figure 2:
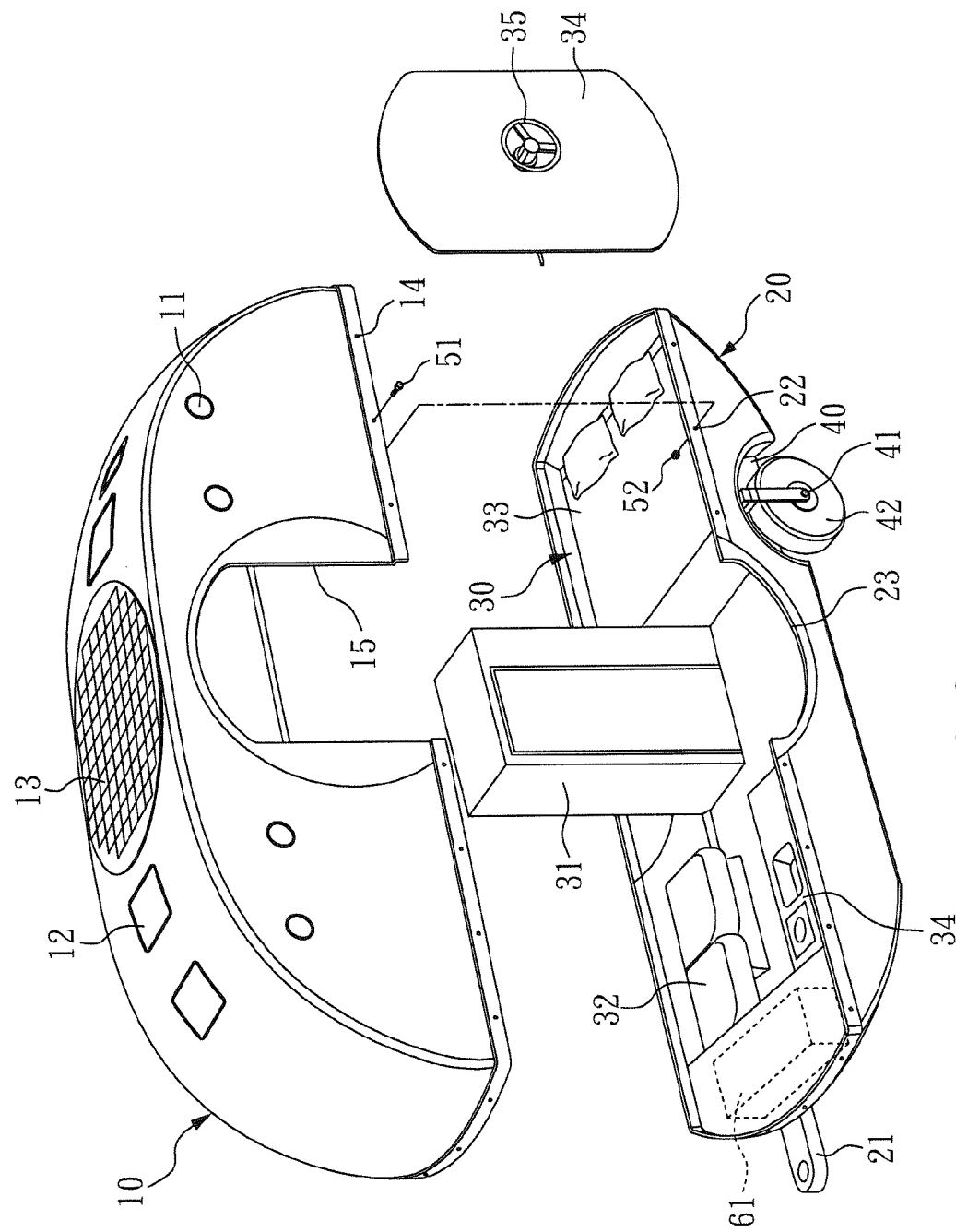
FIG. 2 is an exploded view illustrating the evacuation cabin according to the present invention.

Referring to FIG. 1, a perspective view illustrating an evacuation cabin according to the present invention, and to FIG. 2, an exploded view illustrating the evacuation cabin, the evacuation cabin comprises an upper housing 10 and a lower housing 20, wherein the upper housing 10 and the lower housing 20 are sealed integrally, so that the whole evacuation cabin is water-sealable. Both the upper housing 10 and the lower housing 20 can be made by molded fiber glass, or aluminum die casting.

Figure 3:
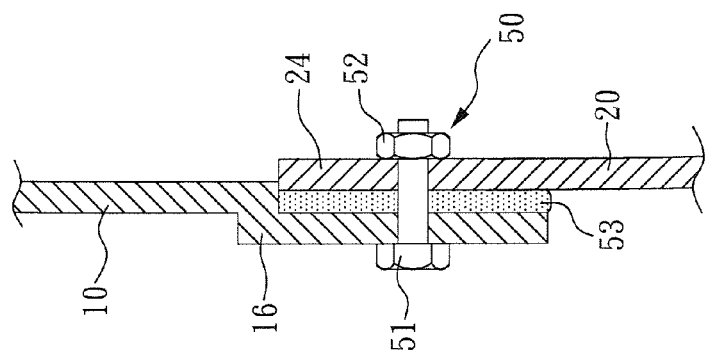
FIG. 3 is a cross-sectional view illustrating a water-sealable joint of an upper housing and a lower housing of the evacuation cabin according to the present invention.

Further, reference may be made to FIG. 3, a cross-sectional view illustrating a water-sealable joint of the upper housing 10 and the lower housing 20. The upper housing 10 is provided, at its bottom edge, with a joining portion 16 along a bottom edge of the upper housing 10, where holes 14, spaced from one another, are provided at the joining portion 16. Likewise, the lower housing 20 is also provided, at its top edge, with a joining portion 24 along the top edge of the lower housing 20, where holes 22, corresponding to the holes 14, are also provided at the joining portion 24. A plurality of fastening means 50 each includes a bolt 51 and a nut 52. When the upper housing 10 and the lower housing 20 are sealed together, the joining portion 16 and the holes 14 are aligned with the joining portion 24 and the holes 22, so that the bolts 51 pass through the holes 14, 22 and are fastened securely with the nuts 52. To assure a water-sealable effect, a sealant 53 is applied in between the joining portions 16, 24 of the upper housing and the lower housing, respectively after the joining portions 16, 24 are joined and fastened.

As shown in FIGS. 1 and 2, according to the present invention, the upper housing 10 is provided, at its top center, with solar panels 13 arrayed, for example, circularly; and provided, beside the solar panels 13, with, for example, square ventilators arrayed in-line. There is also provided, at middle of one side of the upper housing 10, with an opening 15 for receiving an upper part of a water-sealable door 34. The water-sealable door 34 is held to the wall of the upper housing 10, and has a rectangular shape with its top and bottom curved. A rotary handle 35 is provided at the center of the water-sealable door 34 such that by rotating the rotary handle 35, the water-sealable door 34 can be closed or opened. There are also provided, beside the water-sealable door 34, and at both sides of the upper housing 10, with a plurality of windows 11 made of reinforced glass.

Referring to FIG. 2 providing an embodiment of the invention, the lower housing 20 is provided, at middle of one side thereof, with an opening 23 corresponding to the opening 15 of the upper housing 10 and for receiving a lower part of the water-sealable door 34. Also, the lower housing 20 is equipped with a set of furniture 30, including toilet/shower 31, chairs 32, a twin-bed 33, kitchenware 34, and so forth.

Figure 4:
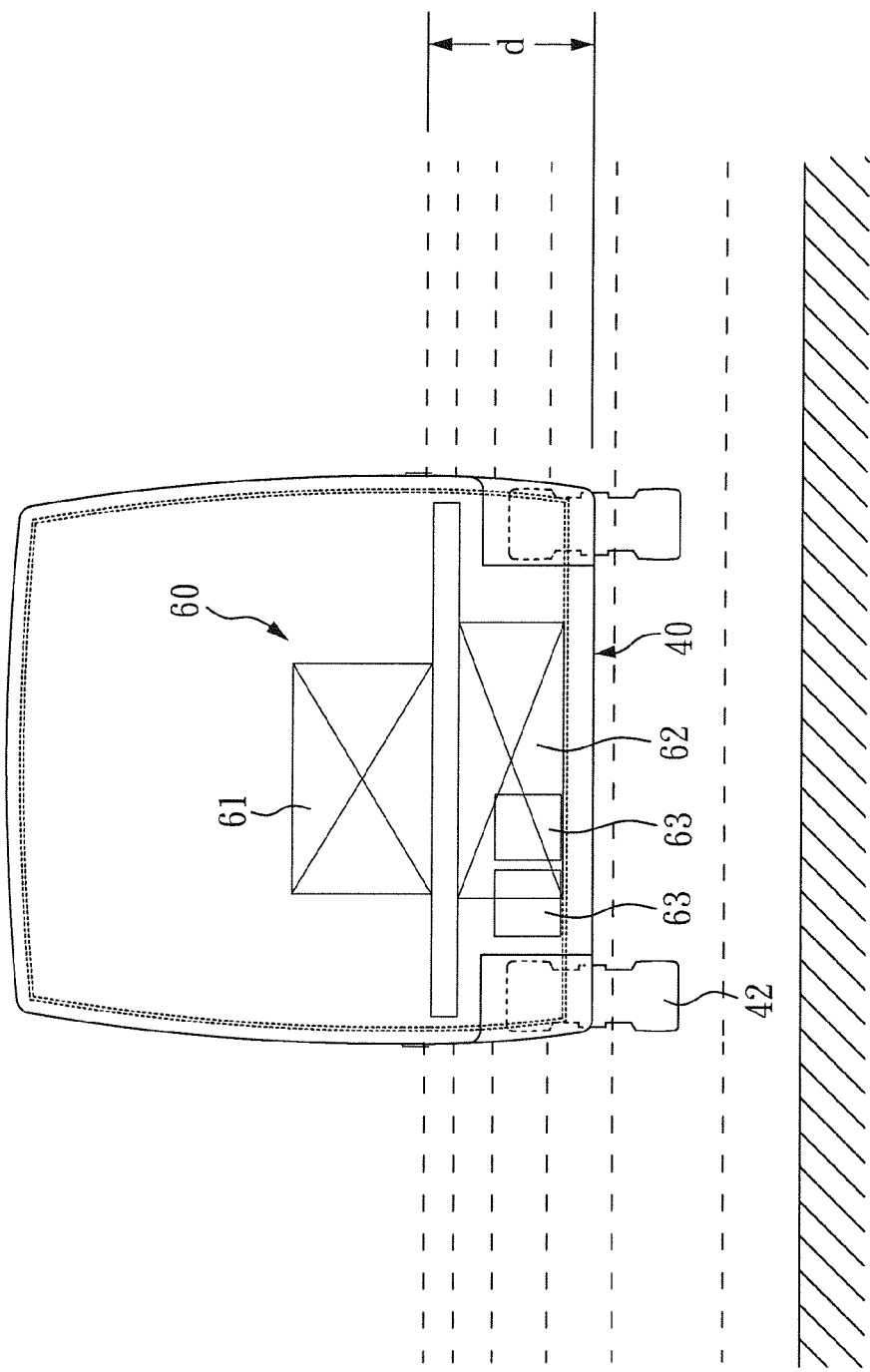
FIG. 4 is a schematic view illustrating the evacuation cabin floating in the water according to the present invention.

Now referring to FIG. 4, a schematic view illustrating the evacuation cabin floating in the water according to the present invention, there are accommodated in the lower housing 20 a power source 60 including a generator 61, a fuel tank 62, and batteries 63, acting as a weight to lower the center of gravity of the evacuation cabin so as to maintain the evacuation cabin in a stable condition when water floods the ground. As designed, the evacuation cabin may float above the ground at a distance d, approximately one third of the height of the evacuation cabin.

Further referring to FIGS. 1, 2 and 4, the evacuation cabin is mounted underneath with a chassis 40 which is provided with an axle 41 for installing wheels 42 so that the evacuation cabin can stand stationary at a certain place, for instance, the backyard of a house; or can be transported as a trailer to a camping site by a mobile which draws the evacuation cabin through an engaging device 21 provided at the front of the lower housing 20.

Although the present invention has been explained in relation to its preferred embodiments, it is to be understood that many other possible modifications and variations can be made without departing from the scope of the invention as hereinafter claimed.

What is claimed is:

1. An evacuation cabin, which is a trailer adapted for a mobile and comprises:
   - a chassis, underneath the evacuation cabin, provided with an axle for installing wheels;
   - an upper housing with flat sides and being arc-shaped from front to back, having a joining portion along a bottom edge of the upper housing, and an opening at middle of one side of the upper housing for receiving an upper part of a water-sealable door;
   - a lower housing with flat sides, having a joining portion corresponding and sealed to the joining portion of the upper housing such that the upper housing and the lower housing are sealed integrally and water-sealably, and having an opening corresponding to the opening of the upper housing and for receiving a lower part of the water-sealable door, wherein there are accommodated in the lower housing a power source, including a generator, a fuel tank and batteries, acting as a weight to lower the center of gravity of the evacuation cabin so as to maintain the evacuation cabin in a stable condition; and
   - an engaging device that is provided at the front of the lower housing,
   - wherein holes are provided along the joining portion of the upper housing, and holes corresponding to the holes of the upper housing are provided along the joining portion of the lower housing such that a plurality of fastening means can pass through the holes and join the upper housing and the lower housing securely,
   - wherein the joining portion of the upper housing and the joining portion of the lower housing are joined and fastened, and then applied with a sealant so as to assure a water-sealable effect, and
   - wherein the upper housing is provided, at its top center, with solar panels.

2. The evacuation cabin of claim 1, wherein ventilators are provided beside the solar panels.

3. The evacuation cabin of claim 1, wherein there are provided, beside the water-sealable door, with a plurality of windows.

4. The evacuation cabin of claim 1, wherein the lower housing is equipped with a set of furniture.

* * * * *